United States Patent
Cusolito

[19]

[11] Patent Number: 5,816,886
[45] Date of Patent: Oct. 6, 1998

[54] SENTENCE FORMING TOY VEHICLE TRACK SET

[75] Inventor: Alan J. Cusolito, Aliso Viejo, Calif.

[73] Assignee: Mattel, Inc., El Segundo, Calif.

[21] Appl. No.: 795,838

[22] Filed: Feb. 6, 1997

[51] Int. Cl.⁶ .......................... A63H 18/00; A63H 19/14; G09B 1/36

[52] U.S. Cl. .......................... 446/444; 446/410; 434/171

[58] Field of Search .................................... 434/171, 172, 434/312; 446/91, 175, 219, 397, 409, 410, 444, 437, 436, 431, 454, 455

[56] References Cited

U.S. PATENT DOCUMENTS

| | | |
|---|---|---|
| 723,425 | 3/1903 | Thompson .......................... 434/171 X |
| 1,303,117 | 5/1919 | Roe . |
| 2,243,971 | 6/1941 | Maatsch . |
| 2,248,473 | 7/1941 | Franklin . |
| 2,331,144 | 10/1943 | Sitter . |
| 3,061,973 | 11/1962 | Oberdorf . |
| 3,108,398 | 10/1963 | Einfalt ...................... 446/444 |
| 3,325,916 | 6/1967 | Greenlee, Jr. . |
| 3,453,921 | 7/1969 | Lohr et al. . |
| 3,477,140 | 11/1969 | Ryan et al. .......................... 434/171 X |
| 3,805,416 | 4/1974 | Plefkey ................ 434/171 X |
| 3,883,146 | 5/1975 | Johnson et al. . |
| 4,044,476 | 8/1977 | Marsh ...................... 434/171 |
| 4,232,202 | 11/1980 | Mori et al. . |
| 4,274,225 | 6/1981 | Knauff et al. . |
| 4,613,309 | 9/1986 | McCloskey .......................... 434/171 X |
| 4,894,040 | 1/1990 | Bach et al. ................ 776/91 |
| 4,925,424 | 5/1990 | Takahaski . |
| 4,937,207 | 6/1990 | Simmell et al. ................ 446/444 X |
| 5,127,869 | 7/1992 | Hanzawa . |
| 5,174,216 | 12/1992 | Miller et al. . |
| 5,195,919 | 3/1993 | Hasegawa . |

*Primary Examiner*—Robert A. Hafer
*Assistant Examiner*—D. Neal Muir
*Attorney, Agent, or Firm*—Roy A. Ekstrand

[57] ABSTRACT

A base supports a closed loop trackway path within which a plurality of recesses are formed. A plurality of tiles shaped in correspondence to the various recesses are receivable within the recesses to lie within the trackway path. The recesses and tiles are shaped in distinctive shapes corresponding to various parts of speech. Each tile bears a visible word as well as a bar code encoded symbol set corresponding to the visible word. In addition, tiles bearing nouns are provided with pictorial representations of the nouns. A toy vehicle includes a drive mechanism for moving the vehicle upon the trackway path across the tiles. The vehicle further includes a sound circuit and bar code reader which is used to scan the bar codes of the tiles and audibilize the corresponding words. The recesses within the trackway path are arranged to assure the correct syntax of sentences formed by the words upon the various tiles.

18 Claims, 2 Drawing Sheets

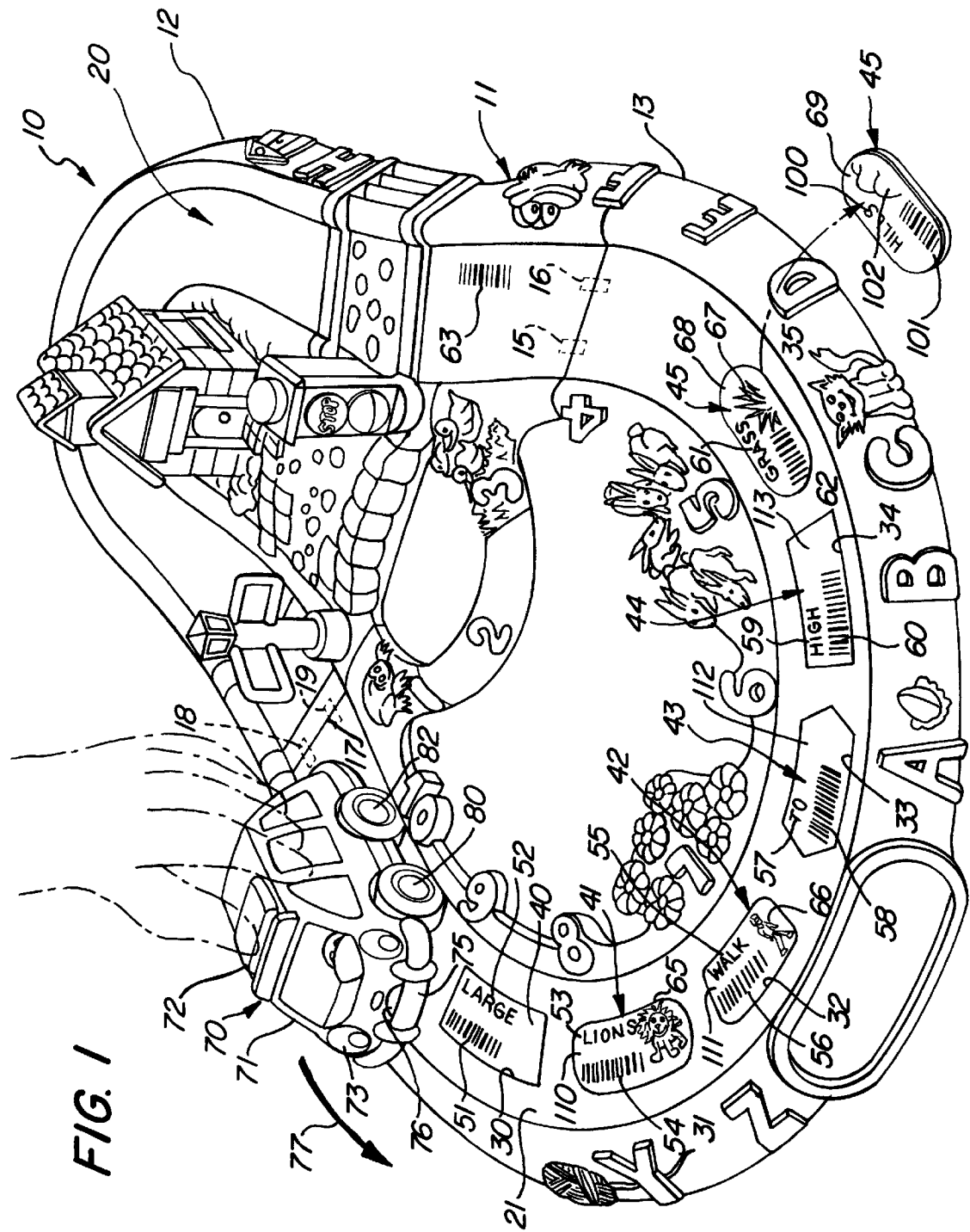
FIG. I

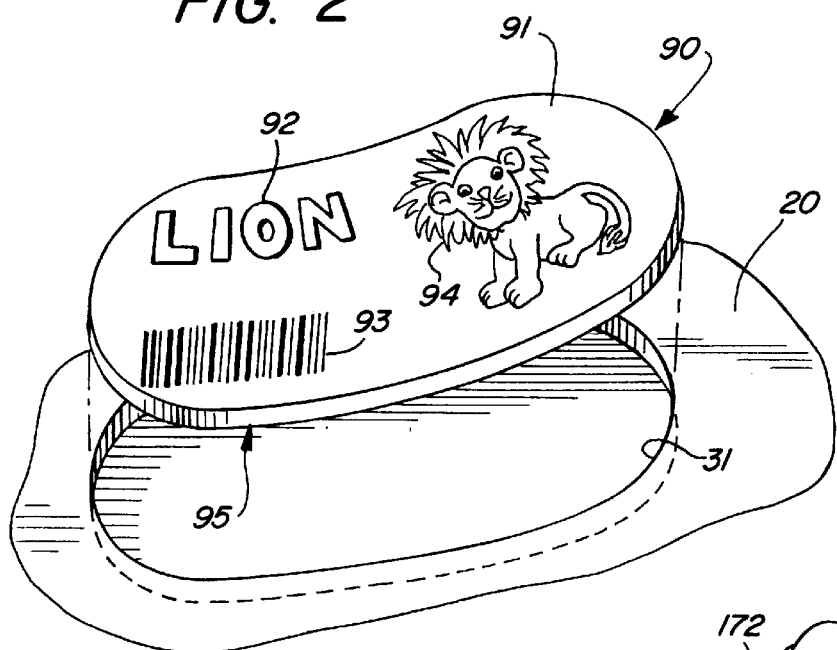
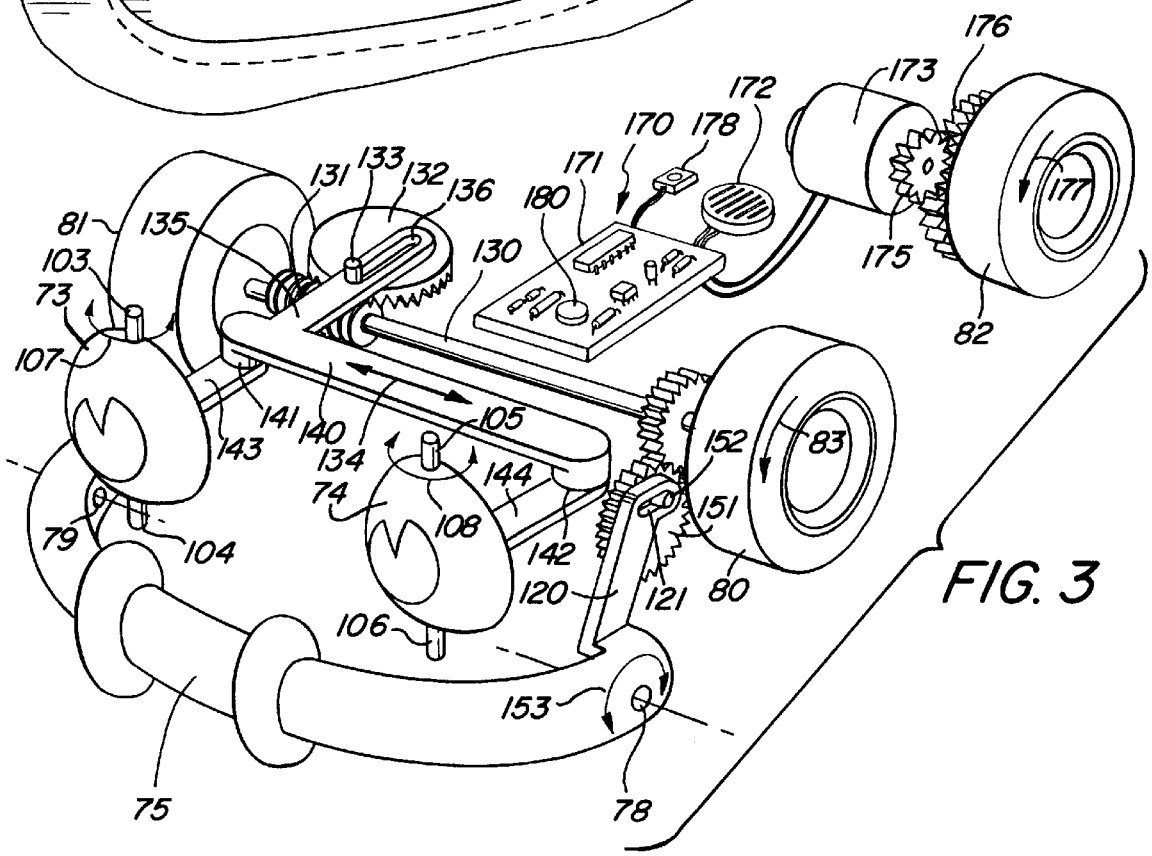

SENTENCE FORMING TOY VEHICLE TRACK SET

FIELD OF THE INVENTION

This invention relates generally to toy vehicles and particularly to those producing audible sounds.

BACKGROUND OF THE INVENTION

Sound producing toys have proven to be an extremely popular toy category and have been provided in a variety of forms. For example, sound producing dolls and toy figures are common within the toy industry. Similarly, toy vehicles having sound producing capability have been provided in plentiful supply. Practitioners have also found that sound producing toys having educational and developmental qualities form a natural extension of the basic sound producing toys.

Sound producing toy vehicles and toy vehicle track sets benefit greatly in enhanced play value and entertainment appeal from the addition of sound production. Often, the objective is to provide a concurrent educational or developmental aspect in combination with the entertainment and enjoyment provided to the child user. Practitioners have, as a result, often found the combination of toy vehicles, toy vehicle track sets and sound producing apparatus to be a fertile area for product development and improvement. As a result, a virtually endless number of sound producing toy vehicles have been provided.

For example, U.S. Pat. No. 2,2248,473 issued to Franklin sets forth a SOUND PRODUCING TRACK AND WHEEL TOY having a closed track configured to receive and guide a movable toy vehicle thereon. The track further includes a plurality of sound grooves situated at the track center. The toy vehicle further includes a pick up needle extending downwardly into the sound groove of the track which is coupled to sound producing apparatus. As the toy vehicle traverses the track, the sound produced by the pick up is provided to the child user.

U.S. Pat. No. 5,127,869 issued to Hanzawa sets forth a SOUND PRODUCING TOY having a board defining a path and a plurality of animal figures drawn on the board along the path. A toy sightseeing bus is moved along the path. Electrically conductive members are found on the path at positions opposing the animal figures for producing commands which specify the corresponding animals. A group of contacts are arrayed on the bottom of the toy bus in such manner that the contacts come in to sliding contact with the electrically conductive members. When the toy bus arrives at a position opposing an animal figure, a set of contacts is closed selectively by the electrically conductive member corresponding to the animal figure so that the closed contacts generate a signal designating the animal.

U.S. Pat. No. 3,453,921 issued to Lohr, et al. sets forth MUSICAL TOYS having a closed track upon which a toy locomotive and attached train car are movable. The movable car includes a plurality of musical tone producing apparatus which are actuated by raised members on the track as the locomotive and the car traverse the track. The result is the production of musical sounds in a sequence determined by the track.

U.S. Pat. No. 5,195,919 issued to Hasegawa sets forth a PANEL PIECE COMBINATION TOY having a panel piece describing a predetermined shape and a baseplate having a fitting hole into which the panel piece is receivable. The panel piece has a sound generating device built into the piece which is actuated as the piece is correctly placed in the appropriate hole.

U.S. Pat. No. 4,232,202 issued to Mori, et al. sets forth a RECORD PLAYER FOR A STATIONARY RECORD DISC in which a conventional record having a spiral sound groove formed therein with signals recorded thereon is maintained in a stationary position and cooperates with a movable body placed on the record disk having a drive assembly for causing the movable body to travel over the record disc. A pickup or cartridge pivotally mounted on the underside of the movable body engages the sound groove and reproduces sound signals recorded on the track as the vehicle moves.

U.S. Pat. No. 3,883,146 issued to Johnson, et al. sets forth a HANDHELD PLAYBACK DEVICE, SYSTEM AND METHOD for use in transducing mini records from the pages of books or other sheet material upon which is shown or otherwise displayed some of the same information as recorded on the mini record.

U.S. Pat. No. 5,174,216 issued to Miller, et al. sets forth a DIGITAL SOUND REPRODUCING SYSTEM FOR TOY TRAINS WITH STORED DIGITIZED SOUNDS RECALLED UPON TRACK SIDE TRIGGERING in which a controller connected to the digital sound memory causes recall of a sound data from a predetermined sequence of addresses when triggered. The recalled sound data is converted into an analog signal for reproduction by a speaker. The sound system is disposed within the car of a model train and magnets disposed between the tracks trigger corresponding sound effects when the model train moves upon the track encountering the magnets.

U.S. Pat. No. 3,325,916 issued to Greenlee, Jr. sets forth a AUDIO VISUAL COMBINATION EDUCATIONAL DEVICE AND TOY having a rotating turntable which receives a plurality of segments having a "pie shape" and supporting visible indicia of an object or word on the upper surface thereof. The outer edges of the segments include information grooves which correspond to the object on the face. As the turntable bearing a plurality of segments is rotated past a reading head, the sound signals are produced which correspond to the picture on the segment.

U.S. Pat. No. 1,303,117 issued to Roe sets forth a BUZZER APPARATUS FOR PRODUCING WHISTLE SIMULATING SOUNDS having a model railroad track and model train movable thereon. The trackway supports apparatus cooperating with the model train for producing a whistle sound as the model train traverses the track segment.

U.S. Pat. No. 2,243,971 issued to Maatsch sets forth a RAILROAD SIGNALING DEVICE having a toy vehicle traversing a roadway. The roadway includes an embedded magnetic element which cooperates with a magnetic element within the toy vehicle to provide interaction as the toy vehicle traverses the roadway portion and the magnet to produce a railroad signal action.

U.S. Pat. No. 4,274,225 issued to Knauff, et al. sets forth a MODEL WITH TWO-POLE MOTOR ACTUATED SIREN AND FLASHING LIGHTS in which a model or toy vehicle is supported upon a base and is operatively coupled to a plurality of control buttons on the base used to produce sound using sound apparatus within the vehicle and the base.

U.S. Pat. No. 4,925,424 issued to Takahashi sets forth a TOY VEHICLE AND TRACK WITH TRACK MOUNTABLE COMMAND SEGMENTS having a toy vehicle adapted to run on a track wherein the track defines a preselected pathway with a preselected geometrical configuration. A plurality of motion command modules are mounted at predetermined locations on the track and each motion command module has a detectable motion pattern array and the motion pattern array of each command module may be different from other modules.

U.S. Pat. No. 2,331,144 issued to Sitter sets forth a MOTOR VEHICLE STEERING MECHANISM for use in guiding a motor vehicle.

U.S. Pat. No. 3,061,973 issued to Oberdorf sets forth a SOUND SYSTEM FOR MODEL RAILWAYS.

While the foregoing described prior art devices have improved the art and have, in some instances enjoyed commercial success, there remains nonetheless a continuing need in the art for evermore improved toy vehicle track sets having sound producing capability.

SUMMARY OF THE INVENTION

Accordingly, it is a general object of the present invention to provide an improved toy vehicle track set. It is a more particular object of the present invention to provide an improved toy vehicle track set having sound producing capability which operates in an interesting and flexible manner. It is a still more particular object of the present invention to provide an improved toy vehicle track set which is entertaining and educational and which encourages and teaches the child user in sentence forming skills.

In accordance with the present invention, there is provided a toy vehicle track set comprising: a base having a path formed thereon and a plurality of tile recesses formed within the path; a plurality of tiles receivable within the tile recesses, each of the tiles having a word encoded thereon; a toy vehicle having means for moving along the path over the tiles; and sound means for reading each encoded word on the tiles as the toy vehicle passes over each tile and for producing audible sounds corresponding to each encoded word.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a toy vehicle track set constructed in accordance with the present invention;

FIG. 2 sets forth a partial section perspective view of a portion of the trackway of the present invention toy vehicle track set; and FIG. 3 sets forth a perspective view of the eye and mouth moving components of the toy vehicle provided in the present invention toy vehicle track set.

DESCRIPTION OF THE PREFERRED EMBODIMENT

FIG. 1 sets forth a perspective view of a sentence forming toy vehicle track set constructed in accordance with the present invention and generally referenced by numeral 10. Track set 10 includes a base 11 formed of half portions 12 and 13 joined at seams 14 and 17. Half portions 12 and 13 are preferably coupled by a plurality of hinges 15 and 16 disposed across seam 14 and hinges 18 and 19 disposed across seam 17. Seams 14 and 17 extend inwardly upon base 11 forming the interface of half portions 12 and 13. In the unfolded position shown in FIG. 1, half portions 12 and 13 are generally coplanar and thus rest easily upon a flat surface such as a tabletop, floor or other play area. Base 11 further defines a continuous trackway path 20 forming a closed loop path across both half portions 12 and 13. In accordance with an important aspect of the present invention, trackway path 20 defines a plurality of tile recesses 30, 31, 32, 33, 34 and 35 spaced upon trackway path 20. Recesses 30 through 35 are shaped to receive correspondingly shaped tiles such as tiles 40, 41, 42, 43, 44 and 45. In the preferred form of the present invention, each of tiles 40 through 45 supports a combination of symbols and words on each side thereof. Thus, for example, tile 40 defines a surface 50 having a readable legend 52 and a bar code legend 51. In the preferred form of the invention, bar code legend 51 corresponds to the word of legend 52. Similarly, tile 51 defines a surface 110 upon which a readable legend 53 and a bar code 54 are printed. In addition, a symbol 65 of pictorial nature is also provided on surface 110. In the preferred fabrication of the invention, word 53, bar code 54 and picture 65 directly correspond. Thus, in the example shown for tile 41, word 53 recites the word "lions" while bar code 54 is encoded to also correspond to the word lions and picture 65 depicts a lion. In similar fashion, tile 42 supports a word 55, a bar code 56 and a pictorial symbol 66 all corresponding to the word "walk". In a further similar fashion, tile 43 supports a printed word 57 and a bar code 58 upon surface 112 of tile 43. Tile 44 includes a surface 113 supporting a word 59 and a bar code 60. Once again, it should be understood that bar code 60 is coded in direct correspondence to the word high formed as word 59 on the tile surface. Finally, tile 45 includes a surface 68 having a word 61, a bar code 62 and a pictorial symbol 67 formed thereon. Word 61 forms the word "grass" and correspondingly, bar code 62 is encoded to provide the word grass when decoded and pictorial symbol 67 depicts a quantity of grass.

In the preferred fabrication of the present invention, the various tiles such as tiles 40 through 45 used therein are provided with image patterns such as those shown on each side of the tile. In addition, it is anticipated in the preferred fabrication of the present invention that a plurality of tiles beyond those shown as tiles 40 through 45 are included with track set 10 to provide greater flexibility and more entertaining play pattern. Thus, for example, tile 45 is shown in FIG. 1 in its inverted position exposing surface 69 upon which word symbol 100, bar code symbols 101 and pictorial symbol 102 are shown. It will be understood by those skilled in the art that each of tiles 40 through 44 is similarly provided with a second symbol set on the underside which is exposed when the tiles are reversed.

To facilitate the sentence forming play pattern of the present invention toy vehicle track set, the various tiles such as tiles 40 through 45 utilized, define shapes corresponding to the parts of speech which the word or words used thereon represent. Thus, for example, tiles such as tile 40 and tile 44 define generally rectangularly shapes and includes words and word symbols which form adjective speech parts. Similarly, tiles such as tile 41 and tile 45 define elongated shapes having rounded or circular ends and support words and symbols corresponding to speech parts known generally as nouns. Further, tiles such as tile 42 define rectangular shapes having rounded corners and support words and symbols known generally as verbs. Finally, tiles such as tile 43 define elongated shapes having pointed ends and support words and symbols corresponding to speech parts known generally as prepositions. To further facilitate the sentence forming activity of the present invention toy vehicle track set, recesses 30 through 35 formed in trackway path 20 define shapes corresponding to the part of speech required for proper syntax when read in the direction indicated by arrow 77 along trackway path 20. Thus, in the example shown, recess 30 is shaped to receive tiles such as tile 40 which correspond to adjectives while recess 31 is shaped to receive tiles such as tile 41 corresponding to nouns. Similarly, recess 32 is shaped to receive only tiles such as tile 42 which correspond to verbs while recess 33 is shaped to receive preposition bearing tiles such as tile 43. Continuing in the order of syntax, recess 34 is shaped to receive adjective tiles such as tile 44 while recess 35 is shaped to receive noun bearing tiles such as tile 45.

In utilizing track set 10, the child user becomes familiar with language syntax in selecting the various tiles to fit within recesses 33 through 35.

The operation of track set 10 is completed by placing a toy vehicle 70 upon trackway path 20 in the manner shown. Toy vehicle 70 includes a body 71 and a plurality of supporting wheels 80 and 82. For added amusement and entertainment, toy vehicle 70 further includes a pair of movable eye-shaped headlights 73 and 74 together with a mouth-like symbol 76 and a cooperating movable bumper 75. The working components of vehicle 70 are set forth in FIG. 3 in greater detail. However, suffice it to note here that toy vehicle 70 includes conventional battery powered propulsion apparatus which drives toy vehicle 70 along trackway 20 in the direction indicated by arrow 77. Thus, once vehicle 70 has been placed upon trackway path 20 and energized, it moves of its own accord along trackway path 20. The side portions of trackway path 20 confine vehicle 70 and maintain its position upon the trackway path.

As is set forth below in greater detail, toy vehicle 70 further includes a conventional sound producing circuit together with a bar code reading apparatus which in accordance with conventional fabrication techniques cooperates to scan each bar code upon each tile as toy vehicle 70 traverses trackway path 20 and produces audible sounds corresponding to the word encoded on each tile. In addition, and by means set forth below in greater detail, the movement of toy vehicle 70 upon trackway path 20 causes rotation of front wheels 80 and 81 (the latter seen in FIG. 3) which in turn drives the movement mechanism seen in FIG. 3 which is operatively coupled to eyes 73 and 74 and to bumper 75. The operating mechanism in turn moves eyes 73 and 74 back and forth and simultaneously moves bumper 75 up and down to produce an amusing animation of toy vehicle 70.

Thus, with tiles positioned within each of recesses 30 through 35, the user energizes toy vehicle 70 allowing it to move under its own power in the direction indicated by arrow 77. As toy vehicle 70 moves across each of tiles 30 through 35, the bar code scanning mechanism within toy vehicle 70 scans the respective bar codes of each tile it traverses. In response to bar code scanning of each tile, the sound producing circuit within toy vehicle 70 produces audible sounds corresponding to the word. As toy vehicle 70 traverses the entire tile sequence, a sentence is articulated which corresponds to the tiles and their arrangement. In the example shown in FIG. 1, the sentence audibilized by toy vehicle 70 as it moves across tiles 40 through 45 is "large lions walk to high grass". As a result, the child user is able to form different sentences in an amusing and entertaining play pattern and to hear those sentences audibilized by toy vehicle 70. This provides an interesting and amusing play operation which is also developmental for the child user in that the child becomes acquainted with language syntax and the arrangement of words within a sentence. The child user then varies the sentence produced by interchanging different tiles within recesses 30 through 35. In this tile interchange, the above-described shaped correlation between recesses 30 through 35 and the parts of speech supported on the correspondingly shaped tiles restricts and guides the child user's selection of tiles to correspond to proper syntax. Thus, for example, in the event the child user reverses the position of tile 45 to expose opposite surface 69 of the tile, the resulting sentence now reads "large lions walk to high hills". It should be noted that the syntax of the sentence formed by the words on tiles 40 through 45 is maintained.

Once toy vehicle 70 has passed beyond recess 35 and continues on trackway path 20, the bar code reader of toy vehicle 70 reads stop code 63 formed on trackway path 20. Bar code 63 provides an input coded signal to the bar code reader which is communicated to the motor drive system of toy vehicle 70 (seen in FIG. 3) which stops the vehicle. In the preferred fabrication of the present invention, the sound circuit within toy vehicle 70 audibilizes a predetermined stored message such as "that was fun; shall we make another sentence" which encourages the child user to form a new sentence using tiles which fit within recesses 30 through 35. The forward direction motion of toy vehicle 70 is restored as the user pushes button 72 upon body 71 again energizing the toy vehicle drive system and causing the vehicle to travel upon trackway path 20 and again traverse recesses 30 through 35 audibilizing the newly formed sentence.

FIG. 2 sets forth a partial perspective view of recess 31 formed in trackway path 20 and a corresponding tile 90. As described above, recess 91 is shaped to receive tiles having noun symbols and words formed thereon. Thus, tile 90 is shaped to be received within recess 31 and defines an upper surface 91 and an undersurface 95. Tile 90 supports a readable word 92, a bar code 93 and a pictorial symbol 94. Readable word 92, bar code 93 and pictorial symbol 94 are all directly corresponding to the particular noun which surface 91 of tile 90 provides. In the example shown in FIG. 2, word 92 corresponds to the word "lion". Correspondingly, bar code 93 is encoded to provide audibilizing of the word lion as toy vehicle 70 traverses tile 90. By way of further correspondence, the pictorial symbol provided by symbol 94 depicts a lion. Thus, the child user is able to associate the audibilized word lion provided by toy vehicle 70 with the written word provided by word 92 and the pictorial symbol provided by symbol 94. As described above, the preferred fabrication of the present invention is provided when the various tiles used therein employ both surfaces for supporting a word symbol set. Thus, for example, tile 90 in its preferred form utilizes surface 95 to support a word, bar code and symbol set different from that provided on surface 91.

FIG. 3 sets forth a perspective view of the operative eye and mouth drive mechanism of toy vehicle 70 together with the sound producing circuit and drive mechanism. As described above, toy vehicle 70 shown in FIG. 1 is supported by a plurality of wheels such as wheels 80, 81 and 82. Vehicle 70 is preferably supported by a fourth wheel positioned behind wheel 81 which is omitted from FIG. 3 to avoid unduly cluttering the figure. Thus, vehicle 70 includes a pair of front wheels 80 and 81 supported by a common front axle 130. Axle 130 further supports a worm gear 131 which in turn is coupled to a rotatably supported gear 132. Gear 132 engages worm gear 131 and is rotated as gear 131 rotates during vehicle motion. Gear 132 further includes an eccentric pin 133 positioned near the outer edge of gear 132. An arm 135 having a slot 136 formed therein is received upon eccentric pin 133. Arm 135 is joined to a traversely supported slider 140. By means not shown in FIG. 3 but in accordance with conventional fabrication techniques, slider 140 is slidably supported within vehicle 70 and is movable back and forth in the directions indicated by arrows 134.

A pair of simulated eyes 73 and 74 are pivotally supported within toy vehicle 70 by means not shown using posts 103, 104, 105 and 106 in a conventional pivotal attachment. The important aspect of the pivotal support of eyes 73 and 74 is the ability to move in pivotal motion about post 103 and 104 in the directions indicated by arrows 107 and about posts 105 and 106 in the directions indicated by arrows 108. A pair of arms 143 and 144 are joined to the rear surface of eyes 73 and 74 respectively and are pivotally coupled by pivots 141 and 142 to each end of slider 140.

Axle 130 further supports a gear 150 which in turn is coupled to a rotatably supported gear 151. Gear 151 is rotatably supported upon vehicle 70 by conventional support means (not shown). Gear 151 further includes an eccentric pin 152 near the outer edge thereof. An arm 120 includes a slot 121 which receives eccentric 152. Arm 120 is joined to bumper 75. The latter is pivotally supported within toy vehicle 70 by conventional support means (not shown) which utilize apertures 78 and 79 formed in bumper 75.

In operation, as toy vehicle 70 is driven forwardly by means set forth below in greater detail, wheels 80 and 81 are rotated in the direction indicated by arrow 83. The rotation of wheels 80 and 81 produces a corresponding rotation of axle 130 and worm gear 131 together with gear 150. As worm gear 131 rotates, gear 132 is correspondingly rotated moving eccentric pin 133 in a circular motion. The sliding support of slider 140 together with slot 136 cooperate to cause slider 140 to move in a reciprocating fashion in the directions indicated by arrow 134. The sliding reciprocating motion of slider 140 is converted to angular motion by pivots 141 and 142 and arms 143 and 144. The result is an oscillatory or reciprocating angular motion of eyes 73 and 74 in the directions indicated by arrows 107 and 108.

Concurrently, the rotation of gear 150 caused by rotation of wheels 80 and 81 causes gear 151 to rotate which in turn moves eccentric pin 152 in a circular motion path. Arm 120 and slot 121 convert the circular motion of eccentric 152 into angular oscillatory motion of bumper 75 about apertures 78 and 79 as indicated by arrows 153.

Thus, as toy vehicle 70 is moved forwardly, rotation of wheels 80 and 81 produces oscillatory motions of eyes 73 and 74 as well as bumper 75. This oscillatory motion provides an amusing visual effect as toy vehicle 70 (seen in FIG. 1) traverses trackway path 20.

Toy vehicle 70 further includes a circuit module 170 having a printed circuit board 171 upon which a plurality of electronic circuit components are disposed together with conventional interconnecting conductive paths (not shown). Circuit module 170 includes a conventional sound producing circuit for providing audible sound signals together with a bar code reader 180. Bar code reader 180 is constructed in accordance with conventional fabrication techniques and may, for example, include a conventional light emitting diode and optical sensor combination of the type commonly used for bar code reading. The function of bar code reader 180 is to convert the optically scanable bar codes on the various tiles such as bar code 93 of tile 90 seen in FIG. 2 to electrical signals corresponding to the encoded information. In response, the sound producing circuit of module 170 produces electrical signals which are applied to a conventional speaker 172. Speaker 172 converts the electrical signals to audible sounds. Circuit module 170 may be fabricated entirely in accordance with conventional fabrication techniques.

Toy vehicle 70 further includes a drive motor 173 supported within vehicle 70 by conventional support means (not shown) and having an output gear 175. Motor 173 is coupled to circuit module 170. Gear 175 is further coupled to a gear 176 which in turn is coupled to rear wheel 82. Thus, when motor 173 is energized, gear 175 rotates gear 176 which in turn rotates wheel 82 in the direction indicated by arrow 177 to provide forward motion of the toy vehicle. Circuit module 170 should be understood to be further coupled to a source of battery power (not shown) and to an on/off switch 178. Switch 178 is operated in response to push button 72 (seen in FIG. 1).

In operation, the user's manipulation of button 72 (seen in FIG. 1) actuates switch 178 which causes circuit module 170 to respond by energizing motor 173. As motor 173 is energized, gears 175 and 176 are rotated causing rotation of wheel 82 in the direction indicated by arrow 177. This wheel rotation in turn propels toy vehicle 70 in the forward direction along trackway path 20. In addition, circuit module 170 controls the operation of bar code reader 180. As toy vehicle 70 moves over a tile within trackway path 20, bar code reader 180 reads and decodes the bar coded signals on the tile. The decoded signals are then processed by circuit module 170 in accordance with conventional fabrication techniques to produce output signals which when applied to speaker 172 produce audible sounds corresponding to the bar code encoded word on the tile. Concurrently as vehicle 70 is moved along trackway path 20 (seen in FIG. 1), the above described operation of the drive mechanisms for eyes 73 and 74 as well as bumper 75 produce the above-described oscillatory motions thereon.

What has been shown is a novel toy vehicle track set which utilizes a plurality of replaceable tiles positioned within recesses formed in the trackway path of the playset. The toy vehicle operative upon the track set includes apparatus for reading the bar coded information on the various tiles to audibilize corresponding words. The tiles provide sequential words of the correct parts of speech to produce complete sentences. The child user is able to vary the sentences by interchanging the tiles within the recesses.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A toy vehicle track set comprising:

a base having a path formed thereon and a plurality of tile recesses formed within said path;

a plurality of tiles receivable within said tile recesses, each of said tiles having a word of language represented by encoded portion thereon;

a toy vehicle having means for moving along said path over said tiles; and sound means for reading each encoded portion on said tiles as said toy vehicle passes over each tile and for producing audibly recognizable words corresponding to each encoded portion.

2. A toy vehicle track set as set forth in claim 1 wherein said tiles and said tile recesses each define one of a plurality of shapes and wherein each of said shapes is associated with a type of the basic parts-of-speech.

3. A toy vehicle track set as set forth in claim 2 wherein said shapes include shapes associated with nouns, verbs and adjectives.

4. A toy vehicle track set as set forth in claim 3 wherein said recesses are arranged on said path such that the tiles received therein form a complete sentence.

5. A toy vehicle track set as set forth in claim 4 wherein said tiles each define opposed generally planar surfaces and wherein each of said surfaces supports a readable word and said encoded portion comprises a bar coded representation of said word of language.

6. A toy vehicle track set as set forth in claim 5 wherein those of said tiles having a shape associated with the noun part-of-speech further include a picture image corresponding to said noun.

7. A toy vehicle track set as set forth in claim 6 wherein shapes include shapes associated with prepositions.

8. A toy vehicle track set as set forth in claim 7 wherein said base includes a pair of base portions and a plurality of hinge members foldably coupling said base portions.

9. A toy vehicle track set as set forth in claim 8 wherein said path further includes a coded portion readable by said sound means for causing said means for moving to stop.

10. A toy vehicle track set as set forth in claim 1 wherein said tiles each define opposed generally planar surfaces and wherein each of said surfaces supports a readable word and said encoded portion comprises a bar coded representation of said word of language.

11. A toy vehicle track set as set forth in claim 10 wherein said path further includes a coded portion readable by said sound means for causing said means for moving to stop.

12. A toy vehicle track set as set forth in claim 1 wherein said words encoded on said tiles include a readable spelling of a word and a bar coded representation of said spelled word.

13. A toy vehicle track set as set forth in claim 12 wherein said sound means includes:

a bar code reader for producing electrical signals corresponding to a bar coded word representation; and a sound circuit for producing audible sounds in response to said electrical signals pronouncing the bar coded word.

14. A toy vehicle track set as set forth in claim 13 wherein said tiles and said tile recesses each define one of a plurality of shapes and wherein each of said shapes is associated with a type of the basic parts-of-speech.

15. A toy vehicle track set as set forth in claim 14 wherein said shapes include shapes associated with nouns, verbs and adjectives.

16. A toy vehicle track set as set forth in claim 15 wherein said recesses are arranged on said path such that the tiles received therein form a complete sentence.

17. A toy vehicle track set as set forth in claim 16 wherein said tiles each define opposed generally planar surfaces and wherein each of said surfaces supports a readable word and said encoded portion comprises a bar coded representation of said word of language.

18. A toy vehicle track set as set forth in claim 17 wherein those of said tiles having a shape associated with the noun part-of-speech further include a picture image corresponding to said noun.

\* \* \* \* \*